United States Patent [19]

Iversen

[11] Patent Number: 5,761,025
[45] Date of Patent: Jun. 2, 1998

[54] LOW COST POWER SWITCHGEAR

[76] Inventor: Arthur H. Iversen, 15315 Sobey Rd., Saratoga, Calif. 95070

[21] Appl. No.: 622,525

[22] Filed: Mar. 25, 1996

Related U.S. Application Data

[63] Continuation-in-part of Ser. No. 387,351, Feb. 13, 1995, Pat. No. 5,550,707.

[51] Int. Cl.⁶ .................................................. H02B 1/14
[52] U.S. Cl. .......................... 361/617; 200/50.27; 218/89
[58] Field of Search ............................ 200/50.21, 50.22, 200/50.27, 304–306; 218/1–7, 34, 36, 46, 76, 77, 89, 156, 158; 361/605, 607, 609, 615, 617

[56] References Cited

U.S. PATENT DOCUMENTS

| | | | |
|---|---|---|---|
| 2,646,481 | 7/1953 | Wood et al. | 218/36 |
| 4,086,452 | 4/1978 | Collins | 200/50 AA |
| 4,216,521 | 8/1980 | Merula | 361/345 |
| 4,272,798 | 6/1981 | Merula | 361/345 |
| 5,475,193 | 12/1995 | Perdoncin | 218/36 |

FOREIGN PATENT DOCUMENTS

| | | | |
|---|---|---|---|
| 0165332 | 12/1985 | European Pat. Off. | 218/1 |
| 384052 | 3/1961 | Switzerland | 218/1 |

Primary Examiner—Gregory D. Thompson
Attorney, Agent, or Firm—Armstrong, Teasdale, Schlafly & Davis

[57] ABSTRACT

There is described a novel arc extinction method for use in switchgear, and improved, low cost power switchgear incorporating the novel arc quenching method. By physically severing the arc and the substantially simultaneous interposition of a high dielectric strength insulating barrier between the fixed contact and the moving contact, substantially consistent and predictable arc extinguishing characteristics are obtained. When the dielectric strength of the barrier exceeds the applied voltage, the arc cannot maintain itself nor can it reignite. Upon detection of a fault, moving contact 16 disengages from fixed contact 12 and retreats 28 from contact 12 creating arc 30. Insulating guillotine 24, in intimate sliding contact with the surface of insulating partition 18 moves 26 toward aperture 20 in partition 18. When edge 31 of guillotine 24 reaches aperture edge 33 of partition 18, arc 30 is severed and extinguished. The covering of aperture 20 by guillotine 24 insulates and isolates fixed contact 12 from moving contact 16 thereby substantially eliminating reignition of the arc. Partition 18 and guillotine 24 may be of high dielectric strength Teflon which withstands the direct action of intense arcs, is superior to ceramics in switchgear and has a low coefficient of sliding friction for the mating surfaces of guillotine 24 and partition 18.

16 Claims, 4 Drawing Sheets

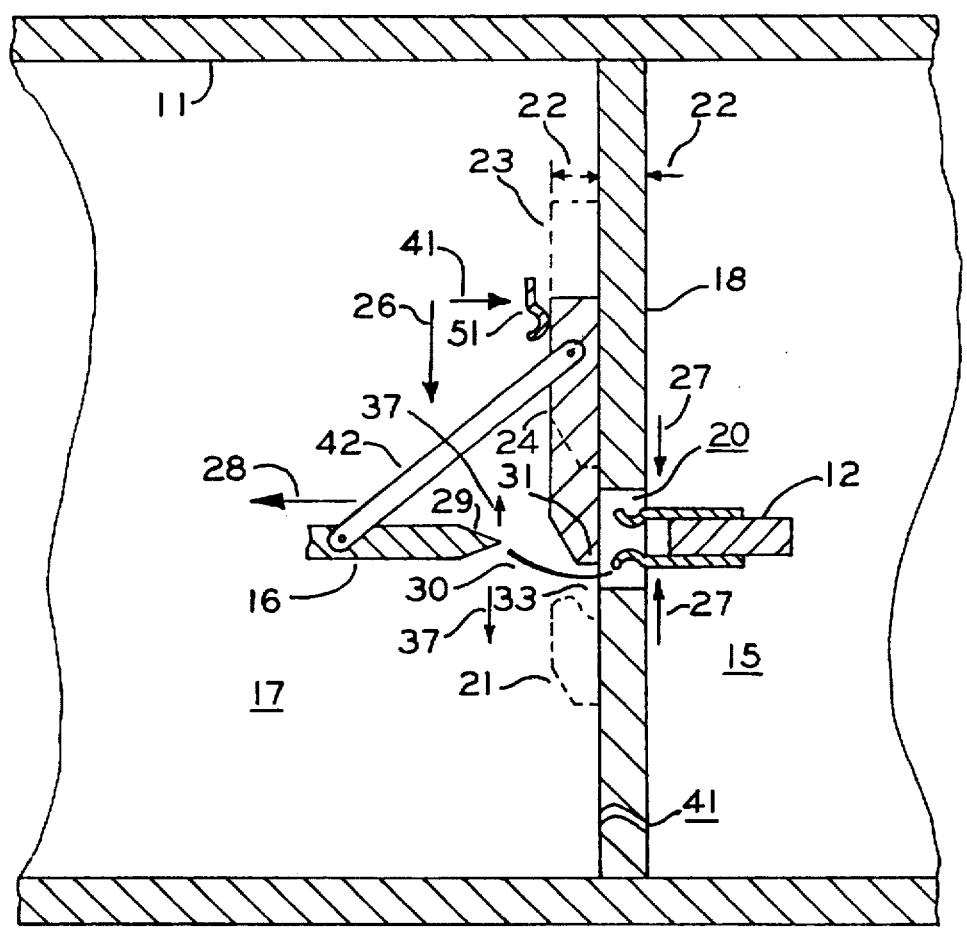
FIG_1
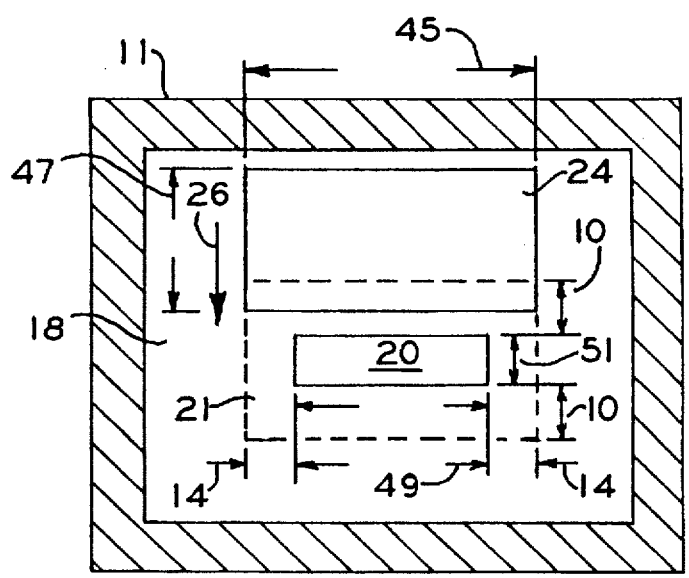
FIG_2

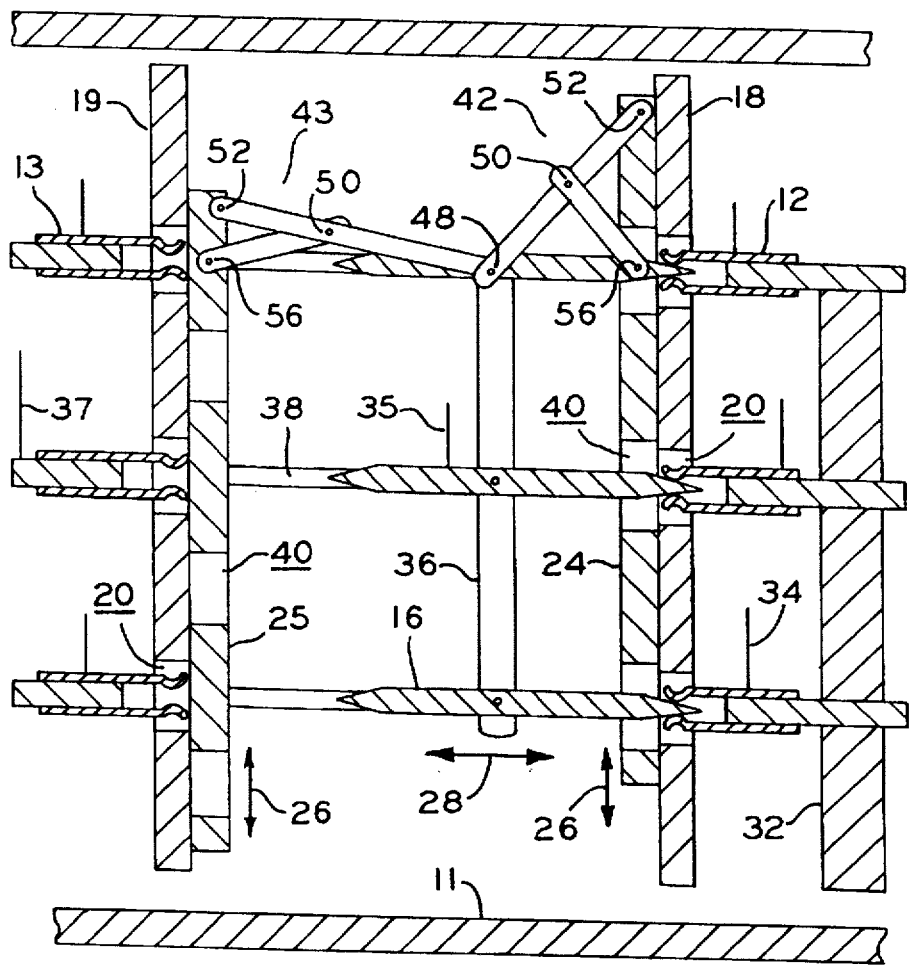
FIG._5
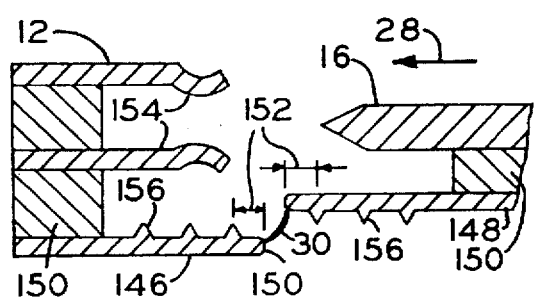
FIG._3
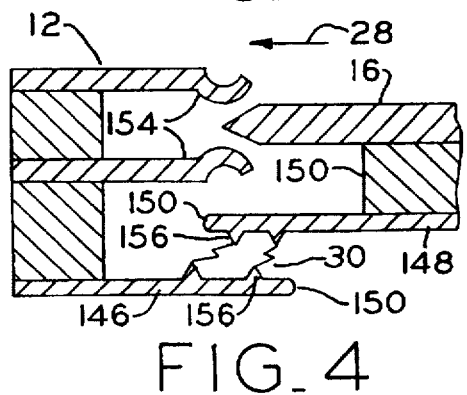
FIG._4
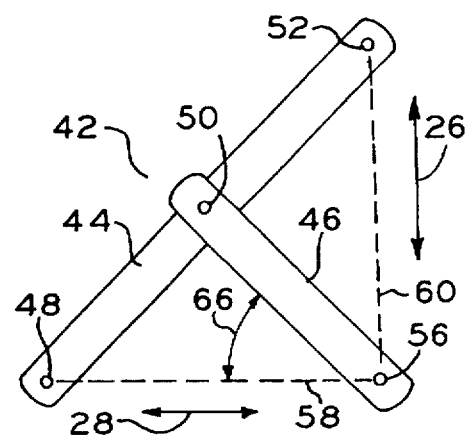
FIG._6

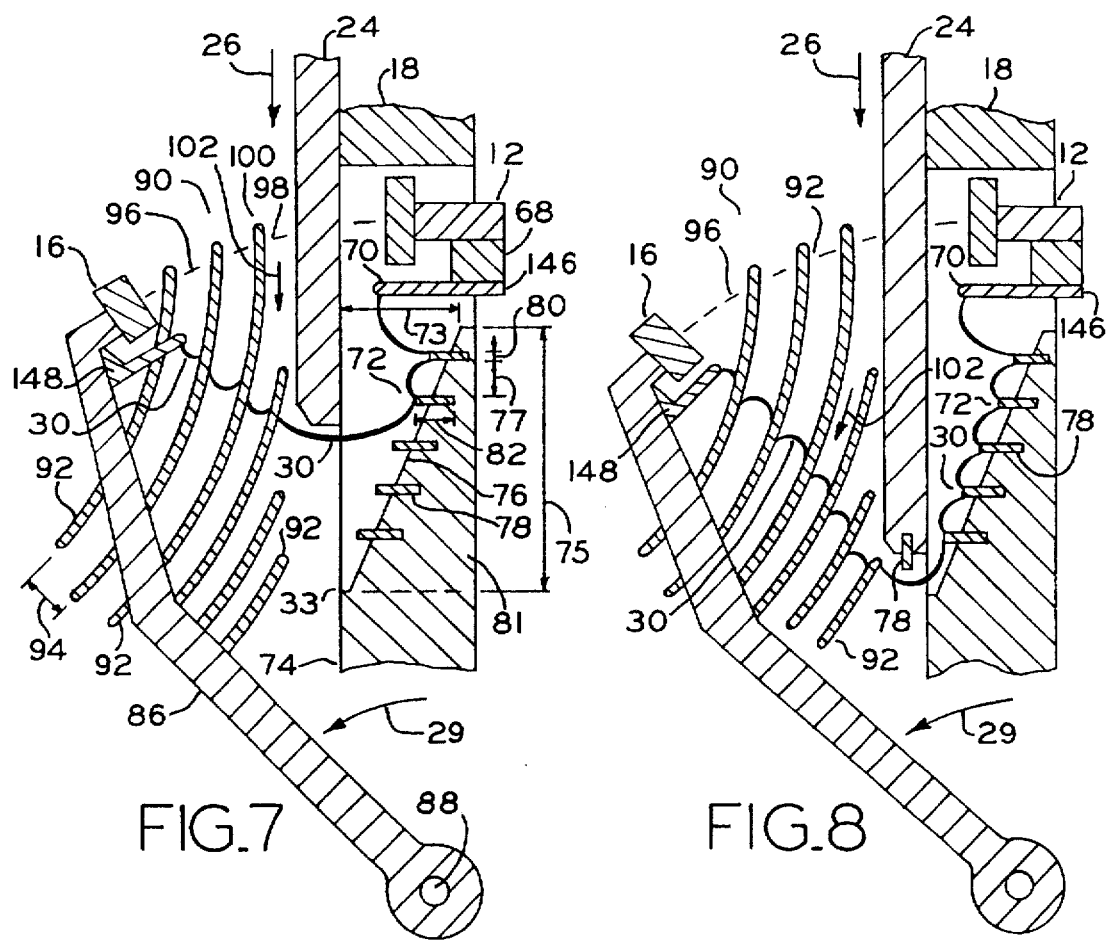
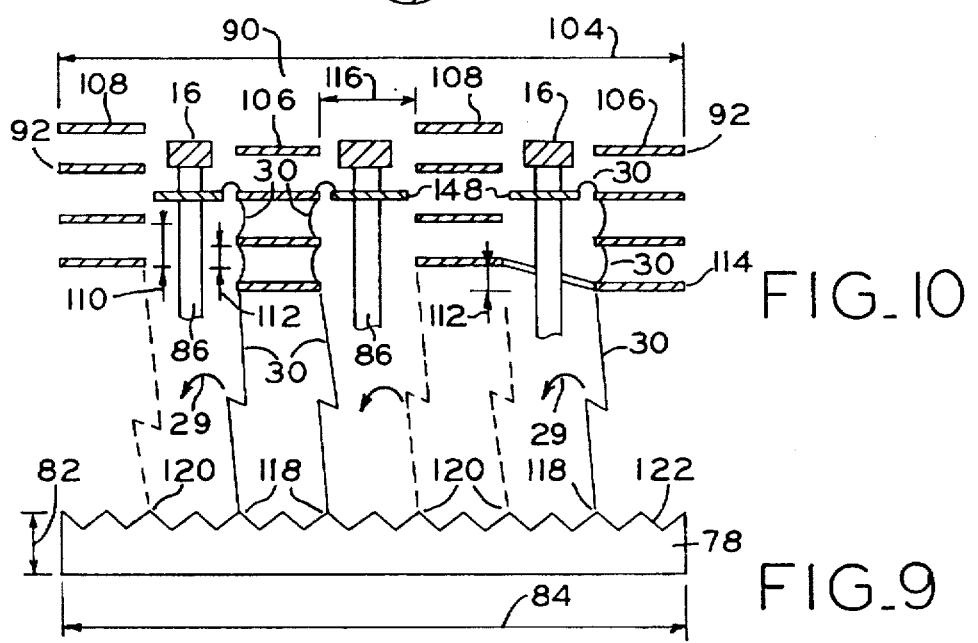

5,761,025

LOW COST POWER SWITCHGEAR

This application is a continuation-in-part application of U.S. patent application Ser. No. 08/387,351, filed Feb. 13, 1995, now U.S. Pat. No. 5,550,707.

BACKGROUND OF INVENTION

1. Field of Invention

The present invention relates to switchgear including switching and interrupting devices and their combination such as circuit breakers, transfer switches, combination circuit breakers and transfer switches, recloser apparatus and similar devices as used in connection with the generation, transmission, distribution and conversion of electric power.

2. Discussion of Prior Art

Present switchgear such as circuit breakers employ various means to extinguish the arc generated upon contactor opening under fault conditions. The behavior of switchgear is dependent on the current broken and the arc energy. The arc is resilient and can be stretched, and possesses resistance which can be increased by lengthening and by confinement. Present techniques for arc extinction include; increasing the arc length, cooling the arc and splitting the arc into a number of series arcs. Methods to achieve the above include arc chutes of both the insulated plate and cold cathode types. Power arcs can evade deionization systems by swerving, by striking out in new and unexpected directions, and by reigniting after they appear to have been successfully extinguished. There is a need for switchgear capable of predetermined and consistent arc extinction, of substantial elimination of arc re-strikes, and of low cost.

OBJECTS AND SUMMARY OF THE INVENTION

The present invention provides a new method for extinguishing arcs in switchgear. By physically severing the arc and the substantially simultaneous interposition of a high dielectric strength insulating barrier between the fixed contact and the retreating moving contact, substantially consistent and predictable arc extinguishing characteristics are obtained. When the dielectric strength of the barrier exceeds the applied voltage, the arc cannot maintain itself or reignite. The short stroke of the moving contacts enables improved zero crossing synchronization and economy in the cost of the mechanism.

The present invention provides for the substantially consistent and predictable extinguishing of arcs in power switchgear.

The present invention provides for the substantial elimination of arc reignition in power switchgear.

The present invention provides for the construction of low cost power switchgear.

The present invention provides for the construction of compact power switchgear.

The present invention provides for short strokes of the moving contacts in power switchgear.

BRIEF DESCRIPTION OF THE DRAWING FIGURES

FIG. 1 is a partial cross section view of the present invention illustrating separation of contacts during the arcing process with the guillotine about to sever the arc.

FIG. 2 is a cross section front view of the dielectric partition and guillotine.

FIG. 3 is a partial cross sectional view of fixed, moving and corresponding arcing contacts as pre-arcing is initiated.

FIG. 4 is a partial cross sectinal view of fixed, moving and corresponding arcing contacts during contact in the circuit make condition.

FIG. 5 is a cross section view of a multiphase combination circuit breaker-transfer switch employing linear motion of the moving contact and guillotine.

FIG. 6 is a side view of the linear mechanical linkage to simultaneously drive the movable contact and the guillotine.

FIG. 7 is a cross section view of the guillotine and partition with separate arc chutes on the fixed butt contact and moving butt contact side of the guillotine illustrating arcing during fault clearing FIG. 8 illustrates the arc coupled to all cold cathode plates of FIG. 7 just prior to arc severance.

FIG. 9 is a top down view of a cold cathode plate from the arc chute on the fixed anode side of the guillotine.

FIG. 10 is a cross section view of multiple paralleled moving contacts bracketed by arc chute cold cathode plates with the cold cathode plate of FIG. 9 positioned to illustrate the path of arcs from the arc chute on the fixed contact side of the guillotine to the arc chute on the moving contact side of the guillotine.

DETAILED DESCRIPTION OF THE PREFERRED EMBODIMENT

Figures 11, 12:
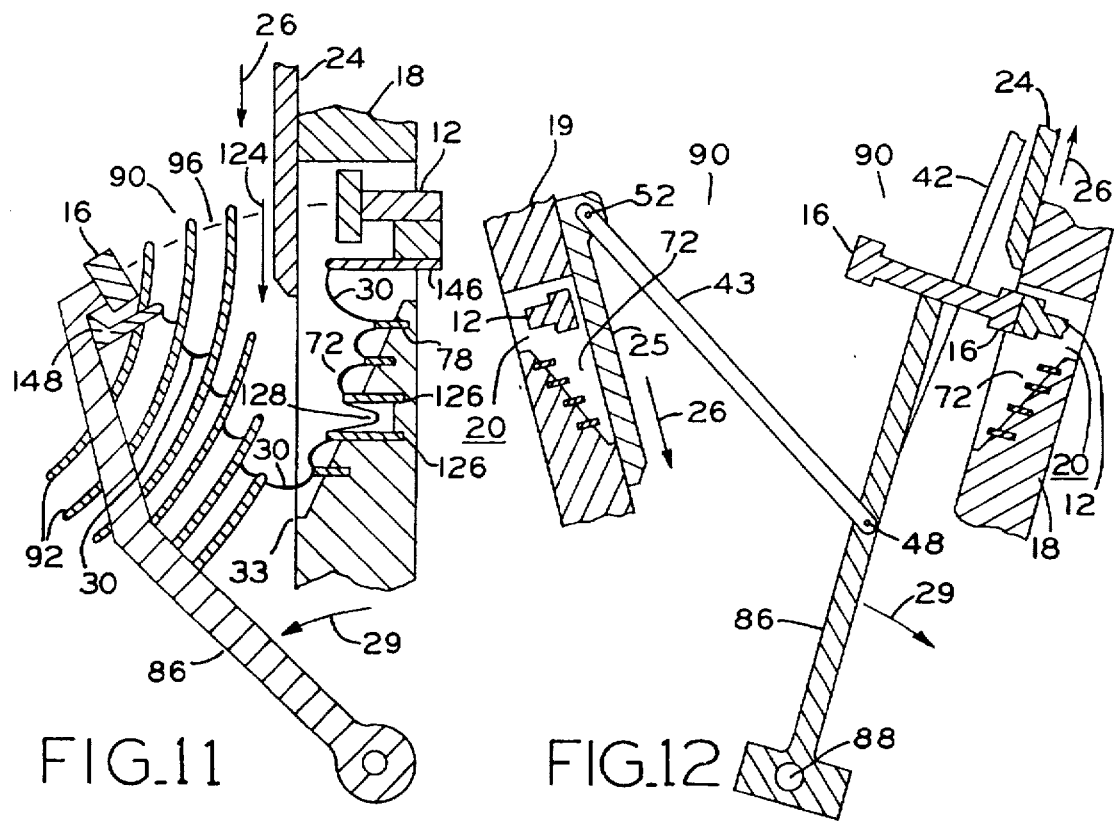
FIG. 11 is FIG. 7 wherein magnetic fields from fault currents are employed advantageously to force the arc toward its severance point ahead of the guillotine.
FIG. 12 is FIG. 7 configured as a transfer switch.

For convenience, embodiments described herein will be described in terms of circuit breakers, and combination circuit breaker-transfer (bypass) switches. However, the same principles of construction and operation will apply to substantially all switchgear. The principles of construction and operation of the present invention are shown in FIG. 1. Referring now to FIG. 1, shown is moving contact 16 retreating 28 from fixed contact 12 in response to a short circuit or fault condition with resulting arc 30. Insulating partition 18 preferably extends across the complete internal cross section of housing 11, dividing it into two chambers, 15, 17 with only aperture 20 providing communication between the chambers. If communication between chambers 15, 17 is required, for example, for pressure equalization, a passage 41 distanced from aperture 20 that by virtue of placement and geometry inhibits passage of an arc may be provided in partition 18. Under conditions of high energy arcs where excessive pressures may be generated, suitable venting from chambers 15, 17 to the atmosphere may be provided. A movable insulating member 24 herein called a guillotine is in preferably intimate sliding contact with partition 18. The mating surfaces of partition 18 and guillotine 24 are smooth and flat to effectively provide a seal between the mating surfaces. In the open circuit condition where the moving contact 16 is spaced from the fixed contact 12 and guillotine 24 has covered aperture 20 the two chambers 15, 17 are effectively sealed off from each other. Under conditions of high pressures generated by high let-through energy, ($I^2t$), chambers 15, 17 may have vents to the atmosphere.

Partition 18 and guillotine 24 are preferably constructed of dielectric material with low tracking characteristics, for example, P.T.F.E., such as Teflon, P.M.M.A., PVC, polypropolene and polyester. Material with poor tracking characteristics include polycarbonate, epoxy-silica resins, glass-epoxies and phenolic resin bonded paper. Tracking is the formation of a permanent, conducting path or track across the surface of an insulator caused by degradation of the insulating material, as, for example, may be caused by arcing. This generally leads to switchgear failure.

Referring again to FIG. 1, linkage 42, shown in principal and described in more detail in FIGS. 5 and 6, is employed to couple moving contact 16 to guillotine 24 such that proper synchronization of movement takes place whereby guillotine 24 covers and extends beyond aperture 20 as contact 16 moves to the non-current carrying open circuit position. In the closed circuit position with contacts 12, 16 engaged, guillotine 24 has been raised by linkage 42 to expose aperture 20 in partition 18. Other means for coupling guillotine 24 and moving contact 16 may be employed, including separate mechanisms for guillotine 24, such as spring, pneumatically, hydraulically and electro-magnetically. Contact 16 may also be electrically or mechanically driven, is suitably coupled by means, such as mechanical, electrical, electromagnetic, pneumatic or hydraulic to provide the desired synchronous movement of contact 16 and guillotine 24.

A small force 41, from Be—Cu finger stock 51 for example, applied to guillotine 24 and transmitted orthogonal to the mating surfaces of partition 18 and guillotine 24 may be applied to insure that intimate contact is maintained between the sliding surfaces throughout all circuit opening and closing cycles. To further reduce sliding friction, where appropriate, and to provide a seal that can be substantially hermetic between the mating surfaces of 18 and 24, a suitably inert, non-conducting and high temperature lubricant suitable for use in the presence of arcs such as silicone or fluorocarbon oil may be used. This has the further benefit of increasing the dielectric strength of the partition 18 and guillotine 24 interface. Additional details regarding partition 18, guillotine 24, and other components described herein are set forth in U.S. patent application Ser. No. 08/387,351, titled "Low Cost Power Switchgear", filed Feb. 13, 1995, which is hereby incorporated herein, in its entirety, by reference.

Referring now to FIG. 2, the width 45 and length 47 dimensions of guillotine 24 are sufficiently larger than the width 49 and length 51 of aperture 20 such that there is sufficient overlap 14 and 10, shown in dotted outline 21, of the mating surfaces of guillotine 24 on partition 18 to prevent an arc propagating between the mating surfaces from contact 16 to contact 12 as guillotine 24 covers aperture 20 in reaching the open circuit position. This open circuit position is also shown in FIG. 1 in partial cross section with dotted lines 21. In the closed circuit condition when current is flowing, contacts 12 and 16 are engaged and guillotine 24 is distanced from aperture 20 as shown in the dotted outline 23, and as also shown 24 in the face on view of FIG. 2.

Referring again to FIG. 1, upon occurrence of a fault or other pre-determined condition wherein the circuit must be opened and the flow of current interrupted, a mechanism, such as a conventional latch mechanism, commences to draw back movable contact 16 and disengage it from fixed contact 12 thereby interrupting the circuit. As contact 16 moves 28 away from contact 12, guillotine 24 proceeds to slide down the face of partition 18, as shown by arrow 26.

As edge 31 of guillotine 24 approaches aperture edge 33 of partition 18, arc 30 is pinched and then severed as edges 31 and 33 pass each other thereby sealing off chambers 15, 17 and extinguishing the arc. The guillotine 24 and partition 18 are the mechanical mechanism for the severing of arc 30, which ceases to exist, that is, it is extinguished. As long as the dielectric strength of partition 18 and guillotine 24 exceeds that of the applied voltage, the impedance between contacts 12 and 16 is effectively infinite and the arc cannot be maintained nor can it reignite. With a dielectric strength of 19 kV/mm, a 3 mm, about one eighth of an inch thick piece of Teflon can stand off about 50,000V, more than enough for most applications. Should a high degree of rigidity be required for partition 18 and guillotine 24, a core structure of ceramic or other suitably rigid dielectric material may then be coated to a desired thickness, for example in the manner of frying pans, with Teflon or other suitable dielectric material. In addition to Teflon, other dielectric materials of construction of guillotine 24 and partition 18 include, for example, PMMA, Melamine, PVC and Polyester, which are described in "Power Circuit Breaker Theory and Design" edited by C. H. Flurscheim, Peter Peregrimus Ltd.; 1982, hereinafter referred to as Flurscheim. In general, these dielectric materials have low tracking characteristics. That is, they have a low tendency to produce conductive surfaces under the action of electric arcs. The interposition of the high dielectric strength barrier enables a short stroke of the moving contacts to be obtained as the predominant electrical insulation is from the barrier. Instead of open circuit contact spacings measured in the 4 cm range, it is now about 1 cm. This short moving contact displacement permits compact switchgear size, and high speed make and break of contacts.

In the final open circuit resting position, moving contact 16 is spaced from guillotine 24 with guillotine 24 shown in partial dotted outline 21. Referring again to FIG. 2, the open circuit resting position of guillotine 24 is also shown in dotted outline 21 as covering aperture 20 with sufficient horizontal 14 and vertical 10 overlap on to partition 18 to prevent an arc from propagating through the intimate interface of 18 and 24 from contact 12 to contact 16.

Referring again to FIGS. 1 and 2, the finger 12 and blade 16 contact construction offers special benefits in systems having resistive and/or capacitive loads. Examples include electric and hybrid vehicles, UPS systems and the DC link of adjustable speed drives, process control systems, and other electronic equipment. In these circumstances arcing is primarily during contact 12, 16 make and is generally composed of pre-arcing, which occurs just prior to contact make, and arcing during contact bounce which, for example, may be from about 1 millisecond to several milliseconds. Butt contacts are particularly prone to contact bounce due to both the mechanical forces of high speed contact impact and the current-induced electromagnetic "blow-off" forces which repel the contacts. Arcing during contact bounce can produce molten pools of contact metal that can cause contact welding upon contact closure with consequent failure of the circuit breaker or other switchgear.

Pre-arcing can be minimized with the use of properly designed arcing contacts, and finger and blade contact construction can substantially eliminate contact welding due to contact bounce. Finger and blade contact construction can provide current induced electromagnetic "blow-on" forces that tend to clamp the fingers 12 to the blade 16 upon contact in contrast to the repulsion forces of butt contacts. This arises because the current flow is now orthogonal to contact motion instead of being parallel in butt contacts. The mechanical impact of the high speed impact of blade 16 on fingers 12 is to drive them apart to cause contact bounce. However, if the tapered 29 section of blade 16 is provided with a geometry such that under prescribed operating conditions the downward force 27 exerted by fingers 12 is greater than the opposing force 37 generated by the high velocity impact of blade 16 on fingers 12 then mechanically induced contact bounce is substantially eliminated. Thus, both the mechanical and electromagnetic causes of contact bounce and associated potential for contact welding may be substantially eliminated with the use of finger and blade construction of predetermined design.

Please refer now to FIGS. 3 and 4. To minimize erosion of contacts 12, 16, arcing contacts 146 and 148 may be employed. Arcing contact 146 connects to fixed contact 12 by metal spacer 150 and arcing contact 148 connects to moving contact 16 by metal spacer 150. Referring again to FIG. 3 illustrated is assembly of main contacts 12, 16 and their respective arcing contacts 146, 148 just as pre-arcing 30 is initiated prior to circuit make between contacts 12 and 16. The leading edge 150 of arcing contacts 146, 148 are spaced 152 forward of contacts 12 and 16. When edges 150 approach or are in their closest proximity to each other, as contact 16 moves 28 toward contact 12, pre-arc 30 is struck. The combination of forward spacings 152 and the high field gradients associated with the small radius of curvature, sharp edge or other suitable geometry of edge 150 of arcing contacts 146, 148 then conspire to cause pre-arc 30 to strike between edges 150 of arcing contacts 146, 148 at a predetermined placement.

Referring again to FIG. 4, opposing surfaces of arcing contacts 146, 148 are prepared with field enhancing geometries, such as protrusions 156. As leading edges 150 of contacts 146, 148 pass each other, the arc 30 transfers to protrusions 156 where field gradients are the highest. With relative movement of opposing protrusions 156 on contacts 146, 148 past each other, arc 30 moves about to the highest field points, and may, with proper design, be caused to be unstable and break up into transient multiple arcs. This serves to minimize local heating and melting due to reduced delivered energy ($I^2t$) to any one point. As contact 16 moves further and touches fingers 154 of contact 12, current flow is substantially transferred from arcing contacts 146, 148 to contacts 12,16. At this point pre-arc 30 commences to extinguish. Thus, pre-arcing and circuit break arcing and associated damage between contacts 12, 16 is kept minimal.

Referring now to FIG. 5, shown is a further embodiment of FIGS. 1 and 2 as might be used in multiphase switchgear, for example, three phase. The motion of moving contacts 16 and guillotine 24 are substantially linear and substantially orthogonal to each other, as shown in FIGS. 1 and 2 and explained in FIG. 6.

Referring again to FIG. 5, partition 18 is now provided with three spaced apart apertures 20. Each aperture is provided with a fixed contact 12, one for each phase. Contacts 12 may be mounted on and separated by spacing insulators 32 to provide rigidity and alignment. Leads 34 attached to contacts 12 pass through enclosure 11 to outside lugs. Three moving contacts 16 are provided to mate with three fixed contacts 12. Leads 35 attached to contacts 16 are attached to external lugs (not shown). Contacts 16 are linked by arm 36 so as to move in unison. Suitable alignment means such as grooves or rails 38 are provided in opposing walls of housing 11 to guide moving contacts 16 to mate with fixed contacts 12 in the closed circuit position. Guillotine 24 is provided with three apertures 40, which when aligned with apertures 20 allow moving contacts 16 to penetrate in order to mate with fixed contacts 12. Mechanical linkage 42 is provided to couple the movement of moving contacts 16 with guillotine 24 such that when contacts 16 have engaged contacts 12 apertures 40 of guillotine 24 are aligned with apertures 20 of partition 18 thereby permitting union of contacts 16 and 12.

Upon sensing a fault condition, a suitable latch mechanism (not shown), which may be spring, magnetically, pneumatically or otherwise activated, causes contacts 16 to substantially simultaneously disengage from contacts 12 and retreat while guillotine 24 slides down on partition 18 and seals off aperture 20, as in FIG. 1, thereby substantially simultaneously quenching the arcs of all three legs of the three phase system.

The design of mechanisms for operation of switchgear are well known and are described in Flurscheim. Closing mechanisms may be, for example, spring, solenoid or pneumatic powered. Tripping mechanism and mechanical linkages may, for example, be a double-toggle closing mechanism with latch and trip catch, a cam-operated closing mechanism with latch and trip catch, a high-speed tripping mechanism latch type, or a high-speed tripping mechanism electrically held type. Detection of fault conditions may be, for example, electromagnetically or thermally, the methods of construction and execution being well known in the art. Any of the above or other suitable mechanisms well known in the art may be employed in the present invention.

Referring now to FIG. 6, linkage 42 consists of two strips of metal 44, 46. Strip 44 has three holes with pins 48, 50, 52. The spacing 54 between pins 48 and 50 is the same as that between 50 and 52. Metal strip 46 has the same two holes 56 and 50 with the spacing 54 between holes 50 and 56 equal to that of 48 and 50, and 50 and 52. By simple trigonometric analysis, it can be shown that, with pin 56 as the fixed pivot point, if pin 48 travels a straight line 58 through pin 56, then pin 52 will travel in a straight line 60 at exactly 90° to line 58.

Referring again to FIG. 5, it is seen that as moving contact 16 moves toward fixed contact 12, linkage 42 will cause guillotine 24 to rise, the motion being orthogonal to the movement of contact 16. This linear movement combined with pressure 41 as shown in FIG. 1, on guillotine 24 insures that guillotine 24 remains flush against partition 18 during the entire upward and downward motion thereby insuring that the arc cannot find a gap in the interface of 18 and 24 to penetrate through.

A further improvement in the embodiment of FIG. 5 is to incorporate a transfer switch, often called bypass, into the circuit breaker. This has important benefits in application to adjustable speed drives (ASDs) for electric motors, uninterruptable power supplies or power conditioning systems, process controls and like systems where if there is a failure in the converter or inverter, there is an automatic switch over to direct line power or other alternate power source with essentially no loss of function. Alternatively, the bypass may be employed to dissipate stored load energy under fault conditions. For example, should a fault occur in a motor or other inductive load, the stored energy can be considerable. In normal circumstances as this stored energy is dissipated in the arc chute and contacts, often shortening circuit breaker life or resulting in effective destruction of the circuit breaker. With the bypass contact, the surplus energy may be directed away from the contacts to spark gaps, resistor and capacitor networks, or other suitably designed loads where the energy may be dissipated harmlessly. This dual capability normally comes at considerable cost. In the present invention, the added cost is nominal.

Referring again to FIG. 5 where bypass capability has been built into a circuit breaker. Leads 35 to moving contacts 16 bring in the incoming line power. Fixed contacts 12 through lines 34 direct line power to the load, for example, converters of systems such as ASDs, UPS and power conditioning. Opposing fixed contacts 13 through lines 37 direct alternate power, for example, around the ASDs, UPSs and power conditioning systems directly to the motors, process control equipment, computers etc. upon failure of the ASDs, UPSs and power conditioning systems. Thus, while repairs are being made, the end equipment is still functioning. Alternatively, upon failure of the load, such as a motor, contacts 13 may be attached to a power dissipating load as shown in FIG. 30.

Again referring to FIG. 5, a substantially identical set of parts to guillotine 24, partition 18 and fixed contacts 12 comprising guillotine 25, partition 19 and fixed contacts 13 are set up in substantially mirror image fashion opposing 24, 18 and 12. A second linkage 43 that is substantially identical to 42 is provided. With contacts 16 centered, a slice down the center yields a substantially mirror image construction. Linkages 42 and 43 share pin 48 on moving contact 16 in common such that all motions are coupled. As can be seen, when moving contacts 16 have engaged contacts 12 in the current conducting closed circuit condition, apertures 40 of guillotine 24 align with apertures 20 of partition 18. At the same time guillotine 25 has sealed off apertures 20 of partition 19 containing bypass contacts 13 in the nonconducting current interrupted open circuit condition.

Upon a fault condition, contacts 16 disengages from contact 12 and retreat along rail 38 driven by, for example, springs, electromagnets and pneumatically. As contacts 16 retreat, linkage 42 causes guillotine 24 to fall and seal off apertures 20 and quench the arcs as illustrated in FIG. 1. Simultaneously, linkage 43, which shares common pin 48 with linkage 42 on moving contacts 16, is generating an opposite action by causing guillotine 25 to rise such that aperture 40 will align with apertures 20 of partition 19 thereby enabling contacts 16 to mate with contacts 13 to dose the bypass circuit which completes the power transfer or bypass. This method is unambiguous; it insures that only one of contact 12 or 13 are closed. There is no way both 12 and 13 could be closed simultaneously for a potentially disastrous short circuit. Substantially precise synchronism of contact closure and opening may be achieved. The basic principles of operation of linkage 42 may be applied to substantially all embodiments of the present invention.

A further alternative, for example, in case of end equipment failure, such as a motor, a lockout may be provided, such as a pin (not shown) that intercepts and stops moveable contact 16 at an intermediate position between contacts 12 and 13 such that guillotines 24, 25 cover apertures 20 in partitions 18, 19. In this manner, both circuits containing contacts 12 and 13 are in the open circuit condition with a total interruption of current flow. This capability may be incorporated into all embodiments of the present invention.

Referring now to FIG. 7, shown is the guillotine 24 and partition 18 construction described in FIGS. 1 and 2. Fixed contact 12 is now of the butt contact type and may have electrically and mechanically mounted 68 to it arcing contact 70. An arc chute 72 is provided by cutting back the partition 18 from the guillotine 24-partition 18 interface surface 74, here shown in a generally triangular form in cross section but which may have any arbitrary shape, such as rectangular or curved. Arc chute 72 may be independently fabricated as assembly 81 and mounted in the opening in partition 18 as shown. Insulator surface 76 of arc chute 72 may be prepared with cooling and/or deionizing gas producing material. Upon heating by the hot arc, cooling and/or deionizing gases are produced from surface 76. With the descending 26 guillotine 24, an enclosed space is formed with arc chute 72 geometry. The geometry of the space provides spatial control of the arc impedance, that is, squeezing the arc into a narrow space increases the arc impedance and in this manner contributes to current limiting. The arc chute 72 has suitably spaced apart 77, along surface 76, cold cathode plates 78, sometimes called plates, of thickness 80 and width 82 which may, for example, range from about 0.2 mm to 5 mm in thickness 80 and from about 3 mm to 30 mm in width. Plates 78 may be made of magnetic metal, such as steel, or other suitable metal. Referring now to FIG. 7, shown is cold cathode plate 78 having a length 84. Alternatively, plates may be of "U" or "H" geometries with, in general, each contact 12 having at least one set of plates 78 associated with it.

Referring again to FIG. 7, cold cathode plates 78 are shown mounted in the recessed wall surface 76 of partition 18 with the arc chute 72 having a length 75 and depth 73 tapering to a small value at edge 33 where it merges with the partition 18-guillotine 24 interface surface 74. As depth 73 decreases toward zero at edge 33, the arc-impedance increases. Other cross section shapes of arc chute 72, such as rectangular or curved, provide different arc impedance characteristics with varying distance along arc chute length 75. This provides spatial control of the arc impedance and its associated current limiting characteristics.

Referring again to FIG. 7, moving butt contact 16 may also be fitted with arcing contact 148. Moving contact 16 is affixed to arm 86 which pivots about fixed axis 88. Linkage (not shown) which may function in a manner similar to that described in FIGS. 5 and 6 may be employed to couple the guillotine 24 and moving contact 16. Mechanical linkage design is well-known in the art and suitable examples may be found in the four volume set "Ingenious Mechanisms" published by Industrial Press Inc. N.Y., N.Y. hereinafter referred to as Ingenious Mechanisms.

Referring again to FIG. 7, a second arc chute 90 may be prepared on the moving contact side of guillotine 24. Arc chute 90 comprises spaced apart 94 cold cathode plates 92, sometimes called plates, suitably mounted and positioned such that plates 92 do not interfere with the motion of guillotine 24. Cold cathode plates 92 are formed into optimum geometries, shown here by way of example as being curved. The geometry and placement of plates 92 are intended to enable the maximum number of plates 92 to be employed for a given arc chute 90 geometry to maximize the total arc voltage drop for a given moving contact 16 stroke. This maximizes current limiting and correspondingly minimizes let through energy ($I^2t$). In general, the optimum geometry of plates 92 is such that a line joining moving arcing contact 70 with the lower edge of guillotine 24 intercepting the arc 30 is orthogonal to the surfaces of successive plates 92. As moving contact 16 travels path 96 and guillotine 24 travels 26 down, a complex surface for plates 92 is described, for example, curved as illustrated. In this way the maximum number of plates 92 suitably spaced 94 apart may be employed for a given line length between moving arcing contact 148 and the lower arc intercepting edge of guillotine 24.

The path 96 of moving contact 16 is shown as it rotates 29 about fixed axis 88 away from fixed contact 12 upon a fault condition. As moving contact 16 moves away from fixed contact 12 the first arc struck from arcing contact 148 to arc chute 90 is in the vicinity of the point 98 on plate 100. This is about the same time that guillotine 24 engages arc 30 and commences to stretch it. As contact 16 continues to move along arc path 96 away from contact 12, guillotine 24 pushes down 26 on arc 30 stretching it. As guillotine 24 moves down 26, arc 30 attaches itself progressively to cold cathode plates 78 on the fixed contact 12 side of guillotine 24. At the same time arc 30 is progressively moving down 102 plates 92 even as the arc 30 is engaging additional plates 92. This has the twofold benefit of progressively increasing the arc 30 voltage drop with the increasing number of plates 92 engaging arc 30, and with the arc forced to travel down 102 the plates 92 from combined contact 16 and guillotine 24 movement, the overheating of plates 92 resulting from a stationary arc is avoided.

Referring now to FIG. 8, guillotine 24 is shown in position just prior to severance of the arc 30 at lower edge 33 of arc chute 72. All cold cathode plates 78 of arc chute 72 and plates 92 of arc chute 90 are shown as engaging arc 30 with each plate providing an arc voltage drop typically in excess of 20V each. Guillotine 24 may be fitted with one or more cold cathode plates 78 along the edge that interacts with arc 30. This provides further control of arc 30 placement along the arc intercepting edge of guillotine 24 as the arc traverses the gap between arc chutes 90 and 72, and further provides additional stages of cold cathode plate voltage drop. Depending on the arc chute design and mode of operation, plates 78, 92 may be magnetic such as steel or non-magnetic such as copper, or a suitable combination of magnetic and non-magnetic. In the various embodiments of the present invention, the motion of guillotine 24 edge 31 sliding past partition 18 aperture 20 edge 33 is similar to that of the cutting edges of a scissors. First the arc 30 is pinched or compressed at edges 31, 33 and as edges 31, 33 pass each other isolating the fixed contact 12 form the moving contact 16, the arc is extinguished.

Arcs follow the path of least resistance, that is, lowest impedance, minimum energy. In general the path of lowest impedance is a straight line, however, hot convective air currents, nearby dielectric surfaces and other factors can cause arcs to strike out in unexpected directions. The illustrated curved geometry of plates 92 is intended to indicate the maximum number that can be accommodated within the space of arc chute 90 while providing adequate insulation between plates 92. The arcs 30 are essentially orthogonal from the surface of one plate 92 to the next thereby following the path of least resistance, that is minimum energy. In general, it is this effect that drags down 102 the arcs 30 on plates 92 as guillotine 24 moves down 26 and moving contact 16 follows path 96. The energy contained in an arc can be quite large and at higher currents contacts 16, 12 may be provided with arcing contacts 70 to minimize erosion of contacts 16, 12. In general, it is not desirable to have an arc dwell for a prolonged period on a single point on plates 78, 92 as overheating and melting can take place with consequent potential for damage.

Referring now to FIG. 10 which is a face on cross section of contacts 16, 148 and cold cathode plates 92. Shown is arc chute 90 construction which further reduces the dwell time of arc 30 at any given point on arc chute plates 92. Multiple paralleled contacts 16 with intermediate arc chute plates 92 are shown for high current operation. The width 104 of arc chute 90 and contacts 16 assembly is generally about the same as width 84 of plates 78 of arc chute 72. Moving multiple contacts 16 pivot 29 synchronously to mate substantially simultaneously with a corresponding number of fixed contacts 12. The cross section of plates 92 are seen as columns 106, 108 bracketing contacts 16. Columns 106 and 108 are displaced vertically with respect to each other with the plates 92 of column 106 being intermediate to plates 92 of column 108. With the vertical spacing of opposing plates 92 in column 106 being 110, than the vertical position of a plate 92 in column 108 would be intermediate 112 and preferably half way.

Plates 92 of columns 106, 108 may be individual, or may be "U" or "H" shaped plates 114 with one leg displaced the distance 112. One leg of plate 114 corresponds to column 106 and the other leg corresponds to column 108. The vertical displacement 112 of columns 106 relative to column 108 contributes to arc 30 instability by periodically switching arc 30 from column 106 to column 108. This shifting of the arc 30 has important ramifications of the stationary dwell time of arc 30 on plates 78 in arc chute 72 in FIG. 7.

Referring again to FIG. 10, as moving contact 16 sweeps through arc chute 90 along path 96, arcing contact 148 will arc to the closest plate, that is, the path of least resistance, here shown as plates 92 in column 106. The arc 30 is then seen as progressively arcing across successive plates 92 in column 106 and spanning the gap between the plates 92 of arc chute 90 and the plates 78 of arc chute 72 as shown in FIGS. 9 and 10. Plate 78 of FIG. 9 is shown having the same relative position along the length axis 84 with the respect to plates 92 of arc chute 90 of FIG. 10 along its length axis 104 as plates 78 and 92 in FIG. 7. Referring again to FIG. 10, as arcing contact 148 traverses a vertical distance 112 which now places it adjacent a plate 92 in column 108, the arc 30 shifts from column 106 to column 108 which now constitutes the lowest impedance path. The arc 30 now progressively arcs across the plates 92 of column 108 and crossing the gap to plate 78 of arc chute 72. In addition, the arc 30 has transferred from one wide of arcing contact 148 to the other, that is, from the side adjacent column 106 to the side adjacent column 108. This lowers localized heating.

Referring again to FIGS. 9 and 10, what has occurred is that the arc has shifted a distance approximately equal to the spacing 116 between columns 106 and 108. In general, when spacing 110 between adjacent plates 92 is less than the spacing 116 between column, arc 30 propagation will be from plate 92 to plate 92 and not between columns 106 and 108 because the impedance between opposing plates 92 is lower because the arc seeks the lowest impedance path which generally is a straight line. When the arc 30 leaves the last plate 92 and traverses the gap between arc chutes 90 and 72, the arc 30 will generally terminate on the closest point 118 on plate 78. When the arc 30 shifts from column 106 to 108 and shifts a distance 116, the arc 30, in order to maintain a minimum energy condition, that is, the shortest distance, will also shift about a distance 116 to point 120 on plate 78. Thus, as arcing contact 148 sweeps through arc chute 90, the arc 30 will oscillate back and forth between columns 106 and 108, and correspondingly, the arc 30 will sweep back and forth between points 118 and 120 on plate 78 thereby minimizing arc dwell time at any point on plate 78. Thus, localized heating is minimized on plates 78 and further reduced on plates 92. This method provides controlled arc instability for the purpose of minimizing arc induced heating of plates 78, 92 and arcing contacts 146, 148, or contacts 16, 12. In general, arcs tend to coalesce in a gas, such as air, and thus a single arc may be formed instead of the three described above. However, the arc movement provided by the above described arc chute 90 geometry would still function, there now tending to be one arc instead of three. This may be accommodated by having further relative vertical offsets of plates 92 in columns 106, 108 such that only one of the three shown arcing contacts 148 is in close proximity to a plate 92 and arcing to it at any given instant. In this manner the single arc progressively shifts from one contact 148 to the others in succession thereby obtaining much the same benefit as before.

Referring again to FIG. 9, cold cathode plates 78 may be prepared periodic protuberances 122, here shows as triangular but which may be any geometry such as rounded. The protrusion 122 edges serve to provide anchors for arc 30 such that when the arc emanates from column 106, it will fasten on protrusion 118 which is the shortest distance, and thus the lowest impedance for the arc 30 from column 106. When the arc 30 emanates from plate 92 column 108, the closest distance is to point 120 and so the arc will tend to move there. Thus, the arc oscillates back and forth between predetermined points such as 118 and 120 on plates 78 minimizing localized heating. Protuberances 122 are of sufficiently small size for the geometries employed that arc 30 does not remain locked on point 118 when arc 30 shifts from plate 92 column 106 to column 108, but shifts readily to point 120. Protuberances 122 may be fabricated by, for example, chemical milling, stamping, DM and ganged cutting blade milling of stacked plates. Plates 78, 92 and arcing contacts 146, 148 may employ protuberances.

Methods to employ magnetic fields to force arc movement in a predetermined direction include magnetic blow out structures employing an arrangement of the leads or series connected coils wherein magnetic fields transverse to the arc generate a force ($\bar{J} \times \bar{B}$) such as 124, FIG. 11 that lengthens the arc and, for example, forces it into a quenching chamber. Referring now to FIG. 11, one embodiment of the above in the present invention would have the magnetic field force 124 lengthen the arc 30 in the direction of guillotine 24 movement 26 and also cause arc 30 to engage plates 78, 92. Force 124 effectively replaces the guillotine 24 in forcing the arc 30 down toward the severance edge 33 of partition 18. This has the dual benefits of minimizing erosion of guillotine 24 and causing more rapid engagement of plates 78, 92 thereby more quickly providing a higher arc voltage drop with consequent reduction in let-through energy ($I^2t$). Further arc 30 control may be obtained by the advantageous placement of arc runners which are extensions of the contact 12, 16 structures and which serve, for example, to quickly channel the arc 30 into the arc chutes 72, 90 away from the contact region and to quickly establish the arc in a non-contact region to prolong contact 12, 16 life.

For direct current (DC) applications, strong series magnetic fields and insulated metal or non-metallic arc chutes may be adapted to the present invention to lengthen and cool the arc 30 prior to severance. Other techniques to produce the desired magnetic fields include configuring the current carrying leads into one or more loops combined with outer iron plates, such as 78, 92 to direct the arc in a predetermined direction. This configuration may also employ narrow spaced apart copper plates, such as 78, 92 to cause rapid circular movement of the arc 30 thereby preventing the melting or vaporizing of the copper plates and to improve the dielectric recovery of the cold cathode arcs. Arc chute plates 78, 92 whether insulating such as ceramic, magnetic such as steel or non-magnetic such as copper, and, for example, "U" or "H" shaped, may be employed in all embodiments of the present invention. The theory and concepts of construction of the various arc control means employed in circuit breakers and other switchgear that may be redesigned or modified for use in the present invention are well-known in the art and, for example, may be found in "Circuit Interruption" and references cited therein, edited by T. E. Browne Jr., Marcel Dekker, N.Y., N.Y., 1984, hereinafter referred to as Browne.

To provide further improved current limiting, high speed contact 12, 16 parting is advantageous. Methods that may be employed include, for example, kicker solenoids and contact arm repulsion as described in Browne. A further method, as described in Browne, to obtain more rapid contact 12,16 parting employs slot motor construction.

Referring again to FIG. 11, moving contact 16 is parting from fixed contact 12 under a fault condition and is shown at a point in time similar to FIG. 7. Here the $\bar{J} \times \bar{B}$ force 124 acting on arc 30 is substantially in the same direction as guillotine 24 motion 26 and has forced arc 30 down close to the arc severance point 33 of partition 18 ahead of guillotine 24. The interaction and disposition of force 124 on arc 30 is such as to encourage arc 30 to attach to plates 78, 92 to obtain maximum arc voltage drop. Thus, arc 30 is in position to be mechanically severed upon the coincidence of guillotine 24 edge 31 and partition 18 edge 33 before guillotine 24 reaches edge 31 partition 18 edge 33. This minimizes arc 30 erosion of guillotine 24 and more rapidly establishes maximum arc voltage drop and thereby minimizes let-through energy ($I^2t$).

Referring again to FIG. 11, arc chute insulated plate 126 geometry illustrates the arc 128 driven by $\bar{J} \times \bar{B}$ forces into the narrow space between barrier walls of refractory or semi-refractory insulating material which may be, for example, ceramics such as Alumina, Zircon, Mullite, Aluminum Carbide, AlN and Silicon Carbide. This cools and stretches arc 128 increasing its impedance and consequent voltage drop.

Referring now to FIG. 12, shown is a transfer switch similar in intent and function to that shown in FIGS. 5 and 6. A single pole is illustrated instead of three poles as in FIG. 5. Instead of the linear motion blade 16 contact of FIG. 5, rotating 29 motion of butt contact 16 is shown in FIG. 12. Referring again to FIG. 12, moving butt contact 16 is mated with fixed butt contact 12 of partition 18 thereby comprising the current carrying closed circuit position for the primary contact composed of guillotine 24, partition 18 and fixed contact 12. Guillotine 24 has been raised by linkage 42 thereby uncovering aperture 20 in partition 18 which enables the mating of contacts 16, 12. With contacts 16, 12 of partition 18 mated in the closed circuit position, contact 12 in partition 19 of the secondary contact has been covered and isolated by guillotine 25 by linkage 43 in the open circuit, non-current carrying position. Arc chutes 72, and 90 not shown for clarity purposes, as described in FIGS. 7 and 8 may be incorporated into FIG. 12, and would perform substantially the same function.

Upon a fault condition, contact 16 disengages from primary contact 12 in partition 18 and moves away while linkage 42 commences to pull guillotine 24 down to cover aperture 20. At the same time, linkage 43 to the secondary contact, comprising partition 19, guillotine 25 and fixed contact 12, is lifting guillotine 25 to expose aperture 20 in partition 19 in order to permit contact 16, 12 make to complete the circuit transfer from the primary contact to the secondary contact as described for FIGS. 5 and 6.

The functioning of linkages 42, 43 in FIG. 12 is essentially the same as in FIG. 5. Instead of the linear motions for both the guillotines 24, 25 and blade 16 in FIG. 5, in FIG. 12 the motion of butt contact 16 is rotational, and the motion of the guillotines 24, 25 is linear. This may require more complex linkage 42, 43 designs for FIG. 12 which are well-known in the mechanical arts and may, for example, be found in texts such as "Ingenious Mechanisms." The various embodiments of the present invention may be configured as transfer switches, as described in FIGS. 5 and 12, or other switchgear configurations known in the art.

In circumstances where a large number of short circuit cycles must be endured under high fault currents, or other harsh conditions, arc erosion of guillotine 24 over life may exceed specifications. To reduce degradation of guillotine 24, a secondary or sacrificial guillotine may be employed. Conceptually this serves the same function that zinc plates on ocean going ships serve. Instead of the ships steel plates corroding, the zinc plates corrode. Based on the same concept, the secondary guillotine is subjected to most of the arc induced degradation thereby extending switchgear life.

Figures 13, 14, 15, 16:
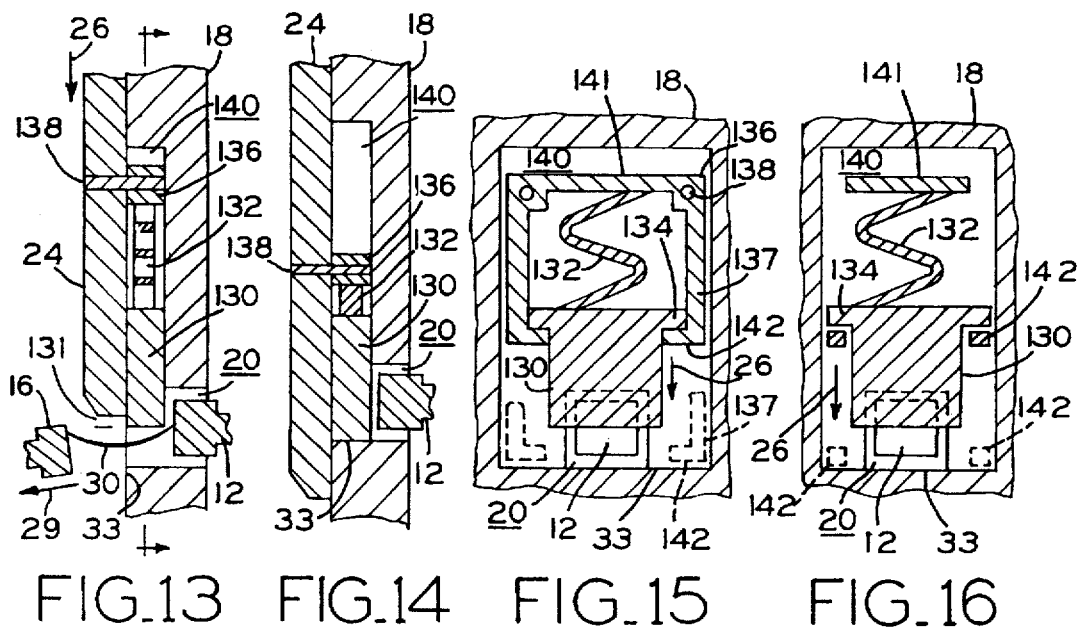
FIG. 13 is a side cross section view of the partition and guillotine fitted with a secondary guillotine illustrating interception of the arc primarily by the secondary guillotine.
FIG. 14 is FIG. 13 after severance and extinguishment of the arc with the guillotine and secondary guillotine in their open circuit positions.
FIG. 15 is a front cross section view of FIG. 13 to illustrate construction of the secondary guillotine.
FIG. 16 is FIG. 15 where the separate frame construction has been replaced by integral guillotine molded construction.

Referring now to FIGS. 13 and 15, shown are side, FIG. 13, and front, FIG. 15, cross sections of the partition 18, fixed contact 12 and guillotine 24 construction incorporating a secondary guillotine 130. Guillotine 130 may be of suitable ceramics or plastic, for example, Teflon, melamine, PMMA, and are preferably of the non-tracking variety. Alternatively, guillotine 130 may be a suitably insulated metal plate or a metal plate, for example, of molybdenum or other refractory or semi-refractory metal. Guillotine 130 is fitted into recess 140 of partition 18. Alternatively, partition 18 may comprise two super imposed members held in registration to each other by suitable means such as adhesives. The partition member adjacent the guillotine 24 has an aperture corresponding to the partition recess 140 and aperture 20, and the second partition member has an aperture corresponding to aperture 20. Frame 136 holds guillotine 130 ears 134 with fingers 142. Suitable means, for example, spring 132, presses secondary guillotine 130 ears 134 against fingers 142 of frame 136 thereby capturing guillotine 130. Spring 132, may be leaf, coil or other suitable shape of metal, or alternative means, such as mechanical linkage or a suitably resilient material with springlike properties may be employed. Frame 136, which may be, for example, of suitable plastic, such as polycarbonate or metal, such as aluminum, is fastened by insulating pins 138 to guillotine 24. Pins 138 are of dielectric material of suitable strength, for example, polycarbonate or ceramic. Pins 138 are a tight fit into partition 24 to insure that no arcing path through partition 24 is provided.

Referring now to FIG. 16, shown is the frame 136 replaced by integral construction with guillotine 24. Molded or machined as a single piece, guillotine 24 incorporates spring stop 141 which protrudes into partition recess 140 and constrains one end of spring 132 while the other end of spring 132 is constrained by the upper surface of secondary guillotine 130. Also integral with guillotine 24 and protruding into partition recess 140 are fingers 142 which, as with frame 136, serve to register secondary guillotine 130 with guillotine 24 and cooperating with guillotine in ears 134 hold guillotine 130 in place against the static compressive force of spring 132. Frame sidearms 137 and pins 138 are eliminated and partition recess 140 is reduced in size.

Referring again to FIG. 13, shown is guillotine 24 driven by a mechanism, not shown, descending from the closed circuit position to the open circuit position upon a fault condition accompanied by secondary guillotine 130. Arc 30 is shown being deflected by secondary guillotine 130 which therefore is subjected to arc 30 induced degradation. Guillotine 24, being shielded by guillotine 130 is subjected to less degradation. Guillotine 130 is shown projecting slightly forward 131 of guillotine 24 to provide a large number of fault cycles before erosion of guillotine 130 exposes the edge of guillotine 24 directly to arc 30. When the force of spring 132 on guillotine 130 exceeds the opposing inertial force arising from acceleration of guillotine 130 under fault conditions then guillotine 130 remains pinned to frame 136 ears 134. Thus, the relative position of guillotines 24, 130 remain unchanged under substantially all conditions.

Referring now to FIG. 14, shown is the open circuit position after fault 30 clearance. The transition from FIG. 13 to FIG. 14 comprises the following. Referring again to FIG. 15, as the lower edge of guillotine 130 descends and approaches surface 33 of aperture 20 in partition 18, arc 30 is pinched and then compressed as guillotine 130 comes to a stop against surface 33 where butt contact is made. Surface 33 includes edge 33 and are used interchangeably. Initially this may or may not cause severance of arc 30, depending on arc current and energy. Guillotine 130 serves to pin arc 30 against surface 33 while guillotine 24 continues to move, passing edge 33 where arc 30 extinguished and spring 132 commences to actively compress.

Referring again to FIG. 15, shown is one example of construction to enable guillotine 130 to stop at surface 33 while guillotine 24 continues to travel 26 downward. Secondary guillotine 130 reaches surface 33 and stops. At this point frame 136 fingers 142 disengage from ears 134 of guillotine 130, and frame 136 continues to travel downward 26 with guillotine 24. At the same time spring 132 actively compresses against guillotine 130. Frame fingers 142, shown in dotted outline have descended toward surface 33 and stopped before reaching surface 33. This corresponds with the open circuit position of guillotine 24 shown in FIG. 14. The pressure from spring 132 on guillotine 130 keeps it pressed against surface 33. Spring 132 also serves two other useful functions. Active compression of spring 132 commences upon stoppage of guillotine 130 at surface 33 which is close to the time of arc 30 severance by guillotine 24 which has continued its downward movement 26. The compression of spring 132 may serve to absorb the energy of moving guillotine 24 after arc 30 severance and may slow it to a stop thereby reducing mechanical stresses accordingly. The second benefit is that the stored energy in spring 132 is available to assist the mechanism in the more rapid raising of guillotine 24 thereby shortening contact make time. In general, the mass of secondary guillotine 130 is small and therefore needed spring 132 forces are low. Though not shown, the arc chutes 72, 90 of FIG. 7 may be incorporated into FIGS. 13, 14, and 15.

I claim:
1. Apparatus comprising:
   a first electrically insulating member having at least one aperture,
   at least one fixed contact,
   at least one movable contact movable between a closed current carrying position with said fixed contact and an open current-interrupting position, said movable contact at least partially located in said first insulating member aperture when in said closed current carrying position,
   a movable second electrically insulating member coupled to said movable contact so that when current flow is interrupted by moving said movable contact to said open current-interrupting position, said movable second electrically insulating member covers said first insulting member aperture and extends beyond the edges of said aperture, and a first arc chute adjacent said fixed contact.

2. Apparatus in accordance with claim 1 further comprising a second arc chute adjacent said movable contact.

3. Apparatus comprising:

a first electrically insulating member having at least one aperture, at least one fixed contact, at least one movable contact movable between a closed current carrying position with said fixed contact and an open current-interrupting position, said movable contact at least partially located in said first insulating member aperture when in said closed current carrying position, a movable second electrically insulating member coupled to said movable contact so that when current flow is interrupted by moving said movable contact to said open current-interrupting position, said movable second electrically insulating member covers said first insulating member aperture and extends beyond the edges of said aperture, and means for forcing an arc between said fixed and movable contacts substantially in a direction toward an arc severance point.

4. Apparatus in accordance with claim 2 further comprising means for forcing an arc between said fixed and movable contacts substantially in a direction toward an arc severance point.

5. Apparatus in accordance with claim 2 wherein said arc chutes comprise at least one of cold cathode plate, insulated plate, and hybrid cold cathode plate and insulated plate.

6. Apparatus in accordance with claim 2 wherein said apparatus further comprises a second fixed contact, a fourth electrically insulating member having at least one aperture, a second movable contact coupled to said first movable contact and movable between a closed current carrying position with said second fixed contact and an open current-interrupting position, said second movable contact at least partially located in said second insulating member aperture when in said closed current carrying position, a movable fifth electrically insulating member coupled to said second movable contact so that when current flow is interrupted by moving said second movable contact to said open current-interrupting position, said second movable second electrically insulating member covers said second insulting member aperture and extends beyond the edges of said aperture and any arc between said second fixed contact and said second movable contact is extinguished, and a second arc chute adjacent said second fixed contact.

7. Apparatus in accordance with claim 2 wherein said second arc chute comprises a plurality of plates.

8. Apparatus in accordance with claim 2 wherein said first and second arc chutes are configured to cause arc movement during fault clearance such that an arc between said fixed and movable contacts has about a minimum dwell time at any one location alone said arc chutes.

9. Apparatus in accordance with claim 3 wherein said means comprise at least one of lead arrangements and series connected coils.

10. Apparatus, comprising:

a first electrically insulating member having at least one aperture;

a first fixed contact;

a first movable contact movable between a closed current carrying position with said first fixed contact and an open current-interrupting position, said first movable contact at least partially located in said first insulating member aperture when in said closed current carrying position;

a first guillotine coupled to said first movable contact so that when current flow is interrupted by moving said first movable contact to said open current-interrupting position, said first guillotine covers said first insulting member aperture and extends beyond the edges of said aperture; and a first arc chute adjacent said fixed contact, said first arc chute comprising a plurality of plates.

11. Apparatus in accordance with claim 10 further comprising a second arc chute adjacent said first movable contact, said second arc chute comprising a plurality of plates.

12. Apparatus in accordance with claim 10 wherein said first guillotine further comprises a plate for interacting with an arc.

13. Apparatus in accordance with claim 10 further comprising:

a second electrically insulating member having at least one aperture;

a second fixed contact spaced from said first fixed contact;

a second movable contact movable between a closed current carrying position with said second fixed contact and an open current-interrupting position, said second movable contact at least partially located in said second insulating member aperture when in said closed current carrying position;

a second guillotine coupled to said second movable contact so that when current flow is interrupted by moving said second movable contact to said open current-interrupting position, said second guillotine covers said second insulting member aperture and extends beyond the edges of said aperture; and a third arc chute adjacent said fixed contact, said first arc chute comprising a plurality of plates.

14. Apparatus in accordance with claim 13 wherein said first movable contact is coupled to said second movable contact.

15. Apparatus in accordance with claim 13 further comprising a fourth arc chute adjacent said second movable contact, said fourth arc chute comprising a plurality of plates.

16. Apparatus in accordance with claim 13 wherein said second guillotine further comprises a plate for interacting with an arc.

* * * * *